United States Patent [19]
Eguchi et al.

[11] Patent Number: 6,078,604
[45] Date of Patent: Jun. 20, 2000

[54] LASER OSCILLATION APPARATUS

[75] Inventors: Satoshi Eguchi, Takatsuki; Takayuki Yamashita; Hiroyuki Hayashikawa, both of Toyonaka, all of Japan

[73] Assignee: Matsushita Electric Industrial Co., Ltd., Osaka, Japan

[21] Appl. No.: 08/885,101

[22] Filed: Jun. 30, 1997

[30] Foreign Application Priority Data

Jul. 1, 1996 [JP] Japan .................................. 8-170858
Aug. 9, 1996 [JP] Japan .................................. 8-210949
Sep. 24, 1996 [JP] Japan .................................. 8-251093

[51] Int. Cl.$^7$ ................................................ H01S 3/097
[52] U.S. Cl. ........................................ 372/83; 372/38
[58] Field of Search .................. 372/38, 35, 61, 372/82, 83, 87

[56] References Cited

U.S. PATENT DOCUMENTS

| | | | |
|---|---|---|---|
| 3,842,365 | 10/1974 | Hundstad et al. | 372/83 |
| 4,147,995 | 4/1979 | Leiby | 372/83 |
| 4,156,208 | 5/1979 | Sasnett | 372/83 |
| 4,686,682 | 8/1987 | Haruta et al. | 372/83 |
| 4,722,091 | 1/1988 | Taylor | 372/83 |
| 4,864,098 | 9/1989 | Basanese et al. | |
| 5,271,026 | 12/1993 | Kosugi et al. | 372/83 |
| 5,471,491 | 11/1995 | Phillips et al. | 372/35 |
| 5,530,937 | 6/1996 | Sugiyama | 372/38 |

FOREIGN PATENT DOCUMENTS

| | | |
|---|---|---|
| 0 680 120 | 11/1995 | European Pat. Off. . |
| 58-63186 | 4/1983 | Japan . |
| 58-79787 | 5/1983 | Japan . |
| 60-147184 | 8/1985 | Japan . |
| 2-148779 | 6/1990 | Japan . |
| 2-137059 | 11/1990 | Japan . |

*Primary Examiner*—Rodney Bovernick
*Assistant Examiner*—Robert E. Wise
*Attorney, Agent, or Firm*—Ratner & Prestia

[57] ABSTRACT

A laser oscillation apparatus includes: a laser cavity unit for generating laser light by being provided a voltage and optically amplifying the generated light by means of a pair of mirrors; and a DC power source for supplying the voltage required for generating the laser light to a pair of discharge electrodes of the cavity unit. Each of a cathode and an anode of the DC power source is grounded via a grounding resistor.

11 Claims, 14 Drawing Sheets

LASER OSCILLATION APPARATUS

BACKGROUND OF THE INVENTION

1. Field of the Invention

The present invention relates to a laser oscillation apparatus for generating laser light by oscillation and optical amplification by means of a pair of optical amplification mirrors. In particular, the present invention relates to a laser oscillation apparatus improved with respect to at least one of a high voltage power source circuit for generating a discharge, resulting in an enhanced freedom in design, a control unit for a cooling mechanism which allows a stable laser output to be achieved in a short period of time after start-up in a cold atmosphere, and a laser light absorption unit for receiving and absorbing laser light and exchanging heat with a coolant.

2. Description of the Related Art

FIG. 14 is a diagram schematically illustrating a configuration around a laser cavity unit 1100 in a conventional laser oscillation apparatus.

In the laser oscillation apparatus shown in FIG. 14, a laser cavity unit 1100 includes a laser tube 106, a partially-transmissive reflection mirror 104, and a total reflection mirror 105. A high voltage is applied from a DC high voltage power source 102 via discharge electrodes 103a and 103b to a gaseous laser medium 101 contained in the laser tube 106 so as to generate a glow discharge. A blower 107 ant a laser medium cooler 108 are serially connected to the laser tube 106 via laser medium conduits 109a and 109b. The laser medium 101 is forcibly circulated by the blower 107. Particularly, the gaseous laser medium 101, heated by the glow discharge, passes through the laser medium conduit 109b, is cooled by the laser medium cooler 108, passes through the blower 107 and the laser medium conduit 109a, and then is sent back to a glow discharge space in the laser tube 106.

The total reflection mirror 105 is provided at one end of the laser tube 106, and the partially-transmissive reflection mirror 104 is provided at the other end thereof. Laser light generated by a discharge passes through the partially-transmissive reflection mirror 104 and exits the laser tube 106.

In the laser oscillation apparatus shown in FIG. 14, the DC high voltage power source 102 is directly connected to the discharge electrodes 103a and 103b via feeder cables 111a and 111b. Furthermore, a cathode of the DC high voltage power source 102, which is connected to the discharge electrode 103b, is grounded by the grounding conductor 110.

In the conventional laser oscillation apparatus having such a configuration as described above, during operation for producing laser light, a DC high voltage E (V), which corresponds to the supplied voltage level of the DC high voltage power source 102 (with the ground level being the reference level), appears at the discharge electrode 103a. (In this application, voltage that is expressed using the ground level as the reference level is deterred to as "voltage to ground".) In such a case, the feeder cable 111a must have a sufficient anti-breakdown property so that it can withstand the DC high voltage E (V). The need for a feeder cable with such a high anti-breakdown property disadvantageously increases cost for conventional laser oscillation apparatuses.

Moreover, since the DC high voltage E; (V) appears at the discharges electrode 103a, it is necessary to provide components constituting the laser oscillation apparatus around the discharge electrode 103a (e.g., a casing body) so as to be disposed with a sufficient distance therebetween depending on the voltage level of E(V) in order to prevent a discharge from being generated between the discharge electrode 103a and the surrounding other components. As a result, design of a laser oscillation apparatus is limited, and further, miniaturization of a laser oscillation apparatus becomes difficult.

Next, a cooling mechanism for optical components included in a conventional laser oscillation apparatus will be described with reference to FIGS. 15 and 16.

FIG. 15 is a diagram schematically illustrating an exemplary configuration of a cooling mechanism which can be used by being connected to the laser cavity unit 1100 of the laser oscillation apparatus described above. Elements in FIG. 15 which are also shown in FIG. 14 are denoted by the same reference numerals and will not be further described.

In the configuration shown in FIG. 15, optical components such as the partially-transmissive reflection mirror 104 and the total reflection mirror 105 are held by a holder 207. During operation of the laser oscillation apparatus, some thermal energy from a discharge may be applied to the bolder 207, and thus, the holder 207 may be deformed by thermal expansion, resulting in deteriorated positional parallel relationship between the partially-transmissive reflection mirror 104 and the total reflection mirror 105. Similarly, when the temperature of the holder 207 is considerably decreased, the partially-transmissive reflection mirror 104 and the total reflection mirror 105 may be shifted with respect to each other from the predetermined positional parallel relationship due to contraction of the holder 207 induced by low temperature. This shift also leads to the deteriorated positional parallel relationship. If the partially-transmissive reflection mirror 104 and the total reflection mirror 105 are not disposed in parallel to each other, sufficient light amplification therebetween is not provided, in which case a stable laser light oscillation may not easily be achieved.

In order to overcome such a problem, oil, for example, is circulated within the holder 207 by means of a pump 208 to cool the holder 207. In particular, such a cooling mechanism using oil includes a tank 211, the pump 208 for supplying the oil into the holder 207, a cooler 210 for cooling the oil, and a thermistor 209 for detecting the oil temperature. Moreover, a control unit 212 is provided for controlling the operation of the cooler 210 based on the oil temperature detected by the thermistor 209. After the operation of the laser oscillation apparatus is initiated, the oil is cooled by controlling the operation of the cooler 210 according to a control loop as shown in a dashed line in FIG. 15.

FIG. 16 shows diagrams provided for illustrating problems associated with such a cooling mechanism for optical components in the conventional laser oscillation apparatus.

Particularly, the portion (a) of FIG. 16 schematically illustrates the change in the temperature of the oil in the cooling mechanism from shutdown to some time after subsequent start-up. The temperature indicated therein can be considered as the temperature of the holder 207, which is cooled by the oil. Moreover, the portion (d) of FIG. 16 is a diagram schematically illustrating the change in the laser output of the laser oscillation apparatus after start-up, and the portions (b) and (c) of FIG. 16 illustrate the operation timing of the pump 208 and the cooler 210, respectively, after start-up.

When the conventional laser oscillation apparatus is standing in a cold atmosphere, for example, in winter, the temperature of the holder 207 becomes considerably lower than the normal operating point temperature of the laser oscillation apparatus. Accordingly, the oil temperature becomes also low as shown in the portion (a) of FIG. 16. Due to such a considerably low temperature, a great amount of time may be required for warm up of the holder 207 to an operating temperature, which is shown as the oil temperature change in the portion (a) of FIG. 16, after the oscillation apparatus has started its operation at the time shown in the portion (d) of FIG. 16 and the pump 208 has accordingly started its operation at the time shown in the portion (b) of FIG. 16. Thus, the positional parallel relationship between the partially-transmissive reflection mirror 104 and the total reflection mirror 105 is shifted for a while after start-up, during which a stable light amplification (laser oscillation) can not be achieved, resulting in a lowered laser output. As a result, as shown in the portion (4) of FIG. 16, a great amount of time is required until the laser output becomes stable again at the normal operating level.

Once the laser output becomes stable at the normal operating level, the control unit 212 acts to cause the cooler 210 to operate at an appropriate time as shown in the portion (c) of FIG. 16. This allows for a stable operation of the laser oscillation apparatus.

Next, a laser light absorption unit included in the conventional laser oscillation apparatus will be described with reference to FIGS. 17 to 19.

The laser light absorption unit is provided on the optical path of the generated laser light. Normally, the laser light absorption unit is located so as to block the optical path of the laser light, thereby preventing the laser light generated in the laser cavity unit from exiting the laser oscillation apparatus at any time other than a desired time, thus functioning as a safety apparatus. Then, once it is confirmed that the laser light may exit (e.g., in a manufacturing site, when it is confirmed that the laser light has been aimed to an object to be processed and that there is no obstruction in the intervening path), the laser light absorption unit is shifted aside the optical path of the laser light so that the laser light exits the laser oscillation apparatus.

FIG. 17 is a cross-sectional view schematically illustrating a configuration of a conventional laser light absorption unit 1310.

In the laser light absorption unit 1310, a conically-shaped inner cylinder 301 is provided at an opening of an outer cylinder 304. The conically-shaped inner cylinder 301 includes a light-receiving surface 302 and a heat-exchanging surface 303 respectively provided on the front surface and the rear surface of the inner cylinder 301. A space existing between the conically-shaped inner cylinder 301 and the outer cylinder 304 provides a path 305 for a coolant 307. The conically-shaped inner cylinder 301 is formed of a metallic material having a high thermal conductivity, e.g., copper or aluminum.

The light-receiving surface 302 is formed in a conical shape with an angle of about 30° or less with respect to the incident axis of the laser light 306 so that the incident laser light 306 is not directed externally after being reflected. Moreover, the light-receiving surface 302 is coated with a material having a high absorptivity for the wavelength of the laser light 306 to be oscillated.

The laser light 306 incident upon the light-receiving surface 302 is quickly absorbed, and the heat produced by the Incident laser light 306 is transferred by conduction to the heat-exchanging surface 303. The coolant 307 introduced into the path 305 through an inlet 308 exchanges heat at the heat-exchanging surface 303 and is drained through an outlet 309.

FIGS. 18 and 19 are cross-sectional views schematically illustrating configurations of other conventional light absorption units 1320 and 1330, respectively. Elements in FIGS. 18 and 19 which are s also shown in FIG. 17 are denoted by the same reference numerals and will not be further described.

In the laser light absorption unit 1310 shown in FIG. 17, the light-receiving surface 302 is formed in a single conical shape. This necessarily causes the light-receiving surface 302 to be large with respect to the incident axis of the laser light 306. On the other hand, in each of the light absorption units 1320 and 1330 shown in FIGS. 18 and 19, respectively, the light-receiving surface 302 is shaped so as to form a plurality of conical shapes, thus reducing the overall size. Also in these cases, the light-receiving surface 302 forms an angle of about 30° or less with respect to the incident axis of the laser light 306.

Generally, laser light has the greatest energy concentration near the center thereof, while the energy concentration becomes smaller toward the peripheral portion of the laser light. Therefore, the light-receiving surface 302 in each of the laser light absorption units 1310 to 1330 must receive and absorb the greatest energy at the center thereof. The energy absorbed at the light-receiving surface 302 is transferred to the heat-exchanging surface 303 on the rear surface while substantially maintaining the temperature distribution thereof. Thus, the temperature on the heat-exchanging surface 303 also becomes highest at the center thereof, while the temperature becomes less toward the peripheral portion thereof. Accordingly, there are large differences in temperature along the radius direction on the light-receiving surface 302 and the heat-exchanging surface 303.

However, in the conventional laser light absorption units 1310 to 1330, the coolant 307 flows irrespective of the temperature distribution in the heat-exchanging surface 303. Therefore, the amount of the coolant 307 to be supplied in the vicinity of the center of the heat-exchanging surface 303, where the temperature is high, is not sufficient (i.e., the flow of the coolant 307 is insufficient). On the other hand, the amount of the coolant 307 to be supplied in the peripheral portion of the heat-exchanging surface 303, where the temperature is low, tends to be excessive. As a result, the heat exchange as a whole becomes non-uniform. Therefore, the temperature increases due to the insufficient cooling capacity near the center of the heat-exchanging surface 303, i.e., near the center of the light-receiving surface 302. This may result in considerable damage, and it would be difficult to maintain a sufficient quality of the laser light absorption units 1310 to 1330 over a long time.

Furthermore, the temperature of the coolant 307 after the heat exchange near the central portion of the heat-exchanging surface 303 becomes extraordinarily high. In some cases, the coolant 307 boils, whereby some vibration is generated. Such vibration may cause some mechanical damage to the laser light absorption units 1310 to 1330 and may hinder the laser oscillation apparatus from operating stably.

SUMMARY OF THE INVENTION

A laser oscillation apparatus of the present invention includes: a laser cavity unit for generating laser light by application of a voltage and optical amplification of the generated light by means of a pair of mirrors; and a DC power source for supplying the voltage required for generating the laser light to a pair of discharge electrodes of the laser cavity unit. Each of a cathode and an anode of the DC power source is grounded via a grounding resistor.

The voltages supplied to the pair of discharge electrodes can be substantially at a same level with each other.

In one embodiment, the laser oscillation apparatus further includes: a holder: for holding at least the pair of mirrors; and a cooling mechanism for cooling the holder with a coolant. The cooling mechanism includes a pump for circulating the coolant, a detector for detecting a temperature of the coolant, a heater for heating the coolant, and a control unit, the control unit causing the pump and the heater to operate while the laser oscillation apparatus is standing so as to increase the temperature of the coolant.

The cooling mechanism can further include a timer connected to the control unit. The control unit, for example, causes the pump and the heater to operate for a certain period of time prior to start-up of the apparatus in accordance with operation of the timer.

In another embodiment, the laser oscillation apparatus further includes a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus. The laser light absorption unit Includes an outer cylinder and an inner cylinder which is provided at an opening of the outer cylinder, the inner cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant. The laser light absorption unit further includes a flow path adjuster having a shape such that the coolant flows i.e. a concentrated manner in the vicinity of a central portion of the light-receiving surface. The flow path adjuster and the heat-exchanging surface are coupled together at an interface therebetween by using a coupling material having a thermal conductivity of about 10 W/m•K or greater.

The flow path adjuster can be formed of at least one blade.

In still another embodiment, the laser oscillation apparatus further includes: a holder for holding at least the pair of mirrors; a cooling mechanism for cooling the holder with a coolant; and a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus. The cooling mechanism includes a pump for circulating the coolant, a detector for detecting a temperature of the coolant, a heater for heating the coolant, and a control unit, the control unit causing the pump and the heater to operate while the laser oscillation apparatus is standing so as to increase the temperature of the coolant. The laser light absorption unit includes an outer cylinder and an inner cylinder which is provided at an opening of the outer cylinder, the inner is cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant. The laser light absorption unit further includes a flow path adjuster having a shape such that the coolant flows in a concentrated manner in the vicinity of a central portion of the light-receiving surface. The flow path adjuster and the heat-exchanging surface are coupled together at an interface therebetween by using a coupling material having a thermal conductivity of about 10 W/m•K or greater.

The cooling mechanism can further include a timer connected to the control unit. The control unit, for example, causes the pump and the heater to operate for a certain period of time prior to start-up of the apparatus in accordance with operation of the timer. Moreover, the flow path adjuster can be formed of at least one blade.

According to another aspect of the present invention, a laser oscillation apparatus includes: a laser cavity unit for generating laser light with optical amplification by means of a pair of mirrors; a holder for holding at least the pair of mirrors; and a cooling mechanism for cooling the holder with a coolant. The cooling mechanism includes a pump for circulating the coolant, a detector for detecting a temperature of the coolant, a heater for heating the coolant, and a control unit, the control unit causing the pump and the heater to operate while the laser oscillation apparatus is standing so as to increase the temperature of the coolant.

In one embodiment, the cooling mechanism further includes a timer connected to the control unit. The control unit, for example, causes the pump and the heater to operate for a certain period of time prior to start-up of the apparatus in accordance with operation of the timer.

In another embodiment, the laser oscillation apparatus further includes a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus. The laser light absorption unit includes an outer cylinder and an inner cylinder which is provided at an opening of the outer cylinder, the inner cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant. The laser light absorption unit further includes a flow path adjuster having a shape such that the coolant flows in a concentrated manner in the vicinity of a central portion of the light-receiving surface. The flow path adjuster and the heat-exchanging surface are coupled together at an interface therebetween en by using a coupling material having a thermal conductivity of about 10 W/m•K or greater.

The flow path adjuster can be formed of at least one blade.

According to still another aspect of the present invention, a laser oscillation apparatus includes a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus. The laser light absorption unit includes an outer cylinder and an inner cylinder which is provided at an opening of the outer cylinder, the inner cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant. The laser light absorption unit further includes a flow path adjuster having a shape such that the coolant flows in a concentrated manner in the vicinity of a central portion of the light-receiving surface. The flow path adjuster and the heat-exchanging surface are coupled together at an interface therebetween by using a coupling material having a thermal conductivity of about 10 W/m•K or greater.

The flow path adjuster can be formed of at least one blade.

Thus, the invention described herein makes possible the advantages of: (1) providing a laser oscillation apparatus in which a sufficient insulation distance can be easily provided between discharge electrodes and other components around the discharge electrodes, and in which freedom in design is improved in connection with, for example, the arrangement of the components around the discharge electrodes; (2) providing a laser oscillation apparatus which allows a stable laser output to be achieved In a short period of time in start-up; and (3) providing a laser oscillation apparatus including a laser light absorption unit which allows for a stable laser light absorption.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying figures.

EXAMPLE 1

Figure 1:
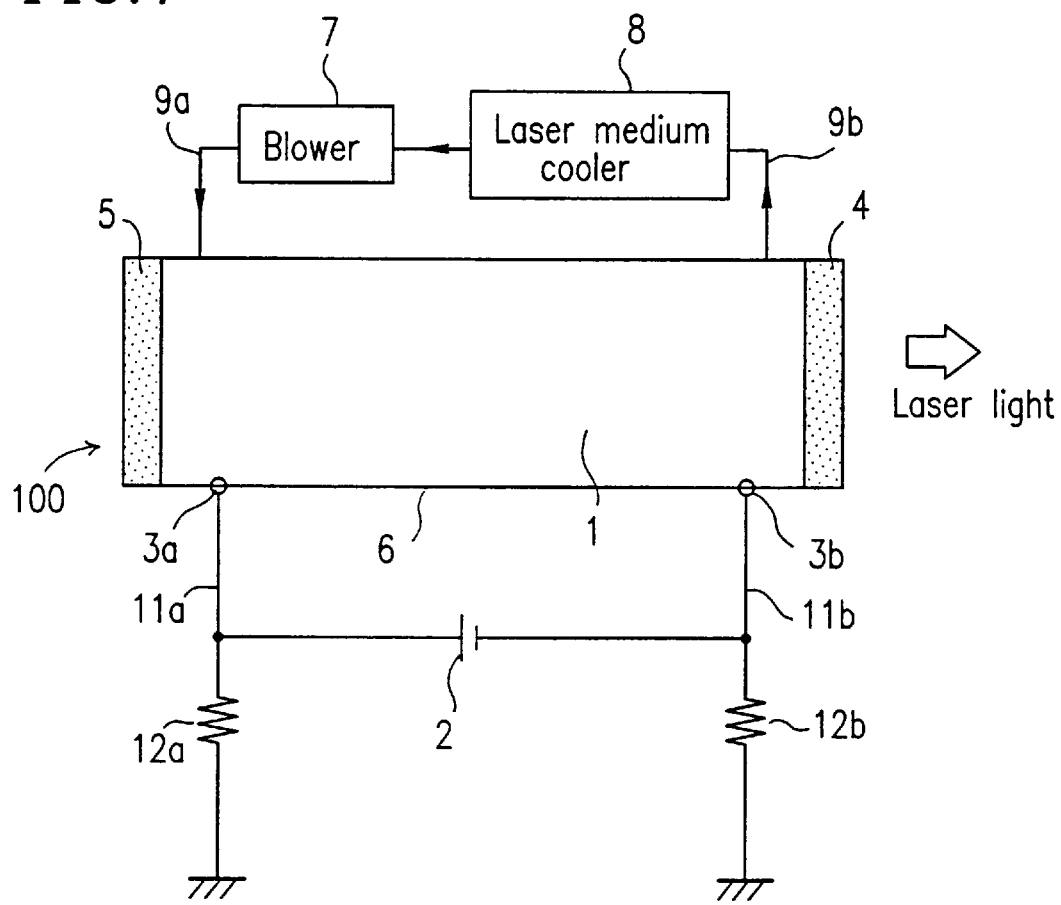
FIG. 1 is a diagram schematically illustrating a configuration around a laser cavity unit in a laser oscillation apparatus according to the present invention.

FIG. 1 is a diagram schematically illustrating a configuration around a laser cavity unit 100 in a laser oscillation apparatus according to the present invention.

In the laser oscillation apparatus shown in FIG. 1, a laser cavity unit 100 includes a laser tube 6, a partially-transmissive reflection mirror 4, and a total reflection mirror 5. A high voltage is applied from a DC high voltage power source 2 via discharge electrodes 3a and 3b to a gaseous laser medium 1 contained in the laser tube 6 so as to generate a glow discharge. A blower 7 and a laser medium cooler 8 are serially connected to the laser tube 6 via a laser medium conduits 9a and 9b. The laser medium 1 is forcibly circulated by the blower 7. Particularly, the gaseous laser medium 1, heated by the glow discharge, passes through the laser medium conduit 9b, is cooled by the laser medium cooler 8, passes through the blower 7 and laser medium conduit 9a, and then is sent back to a glow discharge space in the laser tube 6.

The total reflection mirror 5 is provided at one end of the laser tube 6, and the partially-transmissive reflection mirror 4 is provided at the other end thereof. Laser light generated by a discharge passes through the partially-transmissive reflection mirror 4 and exits the laser tube 6.

Moreover, in the laser oscillation apparatus shown in FIG. 1, the DC high voltage power source 2 is directly connected to the discharge electrodes 3a and 3b via feeder cables 11a and 11b. On the other hand, an anode and a cathode of the DC high voltage power source 2, which are respectively connected to the discharge electrodes 3a and 3b, are grounded via grounding resistors 12a and 12b. Since the grounding resistors 12a and 12b are connected to the anode and the cathode, respectively, of the DC high voltage power source 2, voltage to ground appearing at the discharge electrodes 3a and 3b are determined by the output voltage of the DC high voltage power source 2 and the ratio between the resistance values (i.e., the partial voltage ratio) of the grounding resistors 12a and 12b. As a result, even when the value of the output voltage of the DC high voltage power source 2 is the same as that of the conventional configuration, the voltage to ground of each of the discharge electrodes 3a and 3b can be made lower than that of the conventional configuration.

According to the present invention, since the voltage to ground of each of the discharge electrodes 3a and 3b is thus reduced, the anti-breakdown level required for the feeder cables 11a and 11b, which connect the DC high voltage power source 2 to the discharge electrodes 3a and 3b, can be reduced as compared to the conventional configuration. Moreover, the insulation distance between the discharge electrodes 3a and 3b and other components disposed around the discharge electrodes 3a and 3b can also be reduced as compared to the conventional configuration.

Figure 2:
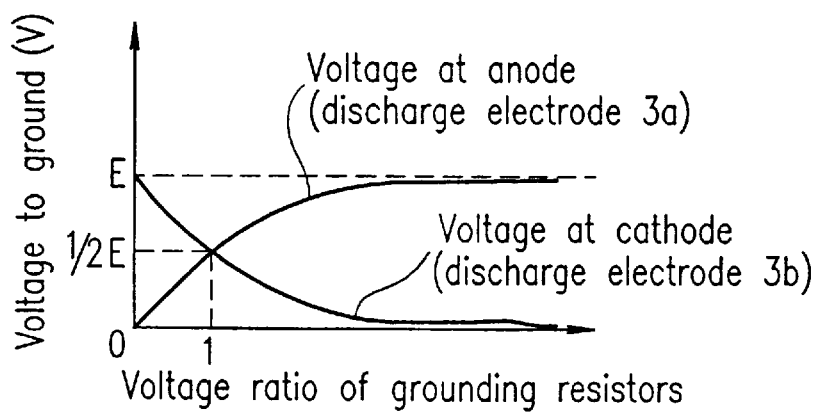
FIG. 2 is a diagram, illustrating the relationship between the voltage ratio of grounding resistors and the respective absolute values of voltages to ground at an anode and a cathode of a DC high voltage power source in the configuration shown in FIG. 1.

FIG. 2 illustrates the relationship between the ratio of resistance values of the grounding resistors 12a and 12b (i.e., the partial voltage ratio) and the respective absolute values of voltages to ground at the anode and the cathode of the DC high voltage power source 2.

In FIG. 2, E represents the output voltage value of the DC high voltage power source 2. The anode and the cathode of the DC high voltage power source 2 are respectively connected to the discharge electrodes 3a and 3b via the feeder cables 11a and 11b. A voltage drop across the feeder cable 11a or 11b is negligible, and therefore, the vertical axis in FIG. 2 can be considered to represent the voltages to ground of the discharge electrodes 3a and 3b.

When the resistance values of the two grounding resistors 12a and 12b shown in FIG. 1 are equal to each other, i.e., when the partial voltage ratio of the grounding resistors 12a and 12b is 1, the absolute values of the voltages to ground of the anode and cathode of the DC high voltage power source 2 are equal to each other to be E/2, as shown in FIG. 2. In such a case, the voltages to ground of the anode and cathode of the DC high voltage power source 2, as well as the voltages to ground of the discharge electrodes 3a and 3b, becomes minimal.

On the other hand, when the partial voltage ratio of the two grounding resistors 12a and 12b is not 1, either the anode or the cathode of the DC high voltage power source 2 has a voltage to ground which is greater than the above voltage level of E/2, as shown in FIG. 2. As a result, the anti-breakdown level required for the feeder cable 11a or 11b connected to the anode or the cathode becomes greater than that in the case where the partial voltage ratio of the grounding resistors 12a and 12b is 1. However, unless the partial voltage ratio is far removed from 1, the voltages to ground of the anode and the cathode of the DC high voltage power source 2 (the voltages to ground of the discharge electrodes 3a and 3b) are still lower than the maximum level thereof (i.e., the output voltage level E of the DC high voltage power source 2), which can appear at the discharge electrode in the conventional configuration without the grounding resistors. Thus, the above-described effects can be realized, such as the reduction in the anti-breakdown level required for the feeder cable 11a or 11b, and the improvement of the freedom in design around the discharge electrodes 3a and 3b.

The output voltage E(V) of the DC high voltage power source 2 is typically about 40 to 50 kV, and the partial voltage ratio of the grounding resistors 12a and 12b can be set in such a manner that, for example, (a resistance value of the grounding resistor 12a):(a resistance value of the grounding resistor 12b)=3:1. In such a case, the resistance value of the grounding resistor 12b can typically be set to several hundred M. By intentionally setting the partial voltage ratio of the grounding resistors 12a and 12b to any value other than 1, the voltages to ground appearing at the discharge electrodes 3a and 3b can respectively be set to desired values. Thus, in the case where a sufficient insulation distance cannot be provided around one of the discharge electrodes 3a and 3b, it is possible to allow voltages to ground of a desired level to appear at the discharge electrodes 3a and 3b according to the respective insulation distances which can be provided around the discharge electrodes 3a and 3b without changing the value of the output voltage of the DC high voltage power source 2.

As described above, the laser oscillation apparatus according to the present example includes the laser cavity unit 100 for generating laser light by discharge-induced excitation of the gaseous laser medium 1 in the laser tube 6 and optical amplification of the generated light by means of a pair of the optical amplification mirrors 4 and 5, and the DC high voltage power source 2 for activating a discharge. Particularly, the grounding resistors 12a and 12b are respectively connected to the anode and the cathode of the DC high voltage power source 2. This enables the voltages to ground of the discharge electrodes 3a and 3b which are respectively connected to the anode and the cathode of the DC high voltage power source 2 to be lowered. This, in turn, allows for use of a feeder cable whose anti-breakdown level is low, and also reduces the insulation distance around the discharge electrodes 3a and 3b so as to increase the freedom in design of the entire oscillation apparatus, thereby facilitating the designing of the apparatus.

EXAMPLE 2

Next, a cooling mechanism for optical components included in a laser oscillation apparatus according to the present invention will be described with reference to FIGS. 3 to 6.

Figure 3:
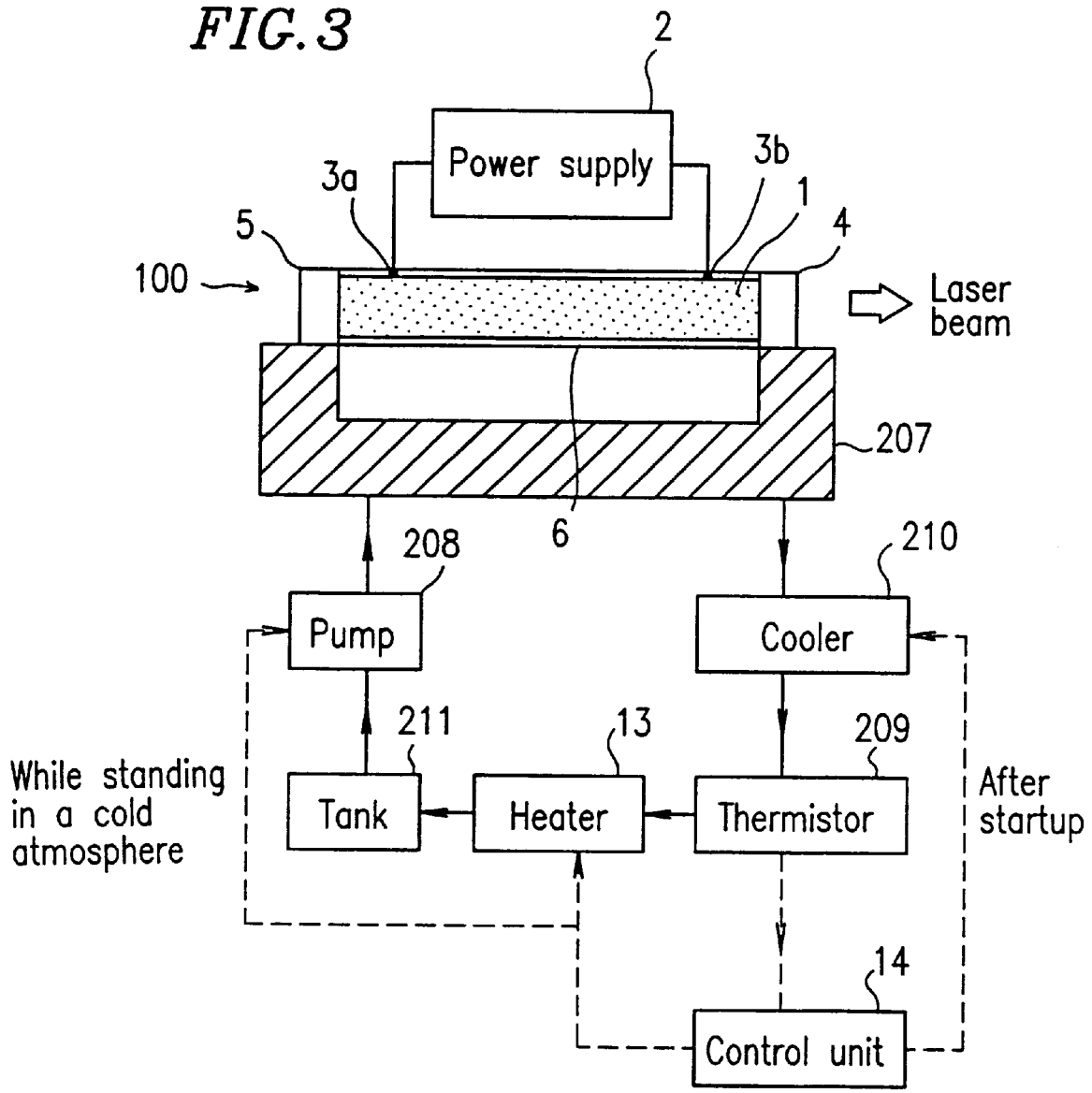
FIG. 3 is a diagram schematically illustrating an exemplary configuration of a cooling mechanism which can be used along with the laser cavity unit of the laser oscillation apparatus according to the present invention.

FIG. 3 is a diagram schematically illustrating an exemplary configuration of a cooling mechanism which can be used along with the laser cavity unit 100 of the laser oscillation apparatus. Elements in FIG. 3 which are also shown in FIG. 1 are denoted by the same reference numerals and will not be further described.

In the configuration shown in FIG. 3, optical components such as the partially-transmissive reflection mirror 4 and the total reflection mirror 5 are held by so the holder 207. A coolant, for example, oil is circulated within the holder 207 by means of the pump 208 to cool the holder 207. In particular, such a cooling mechanism using the coolant, e.g., oil, includes the tank 211, the pump 208 for supplying the oil into the holder 207, the cooler 210 for cooling the oil, and the thermistor 209 for detecting the oil temperature. Moreover, a heater 13 for heating the oil is provided between the thermistor 209 and the tank 211. Furthermore, a control unit 14 controls the operation of the cooler 210 and the heater 13 based on the oil temperature detected by the thermistor 209.

As described above in connection with the conventional laser oscillation apparatus, there is a problem associated with the temperature change of the holder 207 when the laser oscillation apparatus is standing in a cold atmosphere. According to the present example, in order to overcome this problem, the heater 13 is provided in the coolant conduit, and the control unit 14 is used to appropriately control the operation of the heater 13 so as to control the oil temperature by heating the oil in a laser oscillation start-up. Thus, it is possible to keep the temperature of the holder 207 at a predetermined temperature (e.g., the operating point temperature) while standing in a cold atmosphere, so that the positional parallel relationship between the partially-transmissive reflection mirror 4 and the total reflection mirror 5 can be maintained. As a result, even in a laser oscillation start-up after standing in a cold atmosphere, a stable laser output can be achieved in a short period of time.

Particularly, in the configuration shown in FIG. 3, the oil temperature is detected by the thermistor 209 while the laser oscillation apparatus is standing. When a decrease in the temperature beyond a predetermined range is detected, the control unit 14 activates the pump 208 and the heater 13. Thus, the holder 207 is heated by circulating heated oil therein so that the temperature of the holder 207 is raised to an appropriate value even while standing. After start-up, the oil is cooled by controlling the operation of the cooler 210 based on the oil temperature detected by the thermistor 209, thereby maintaining the temperature of the holder 207 at an appropriate value.

Due to such a configuration, the positional parallel relationship between the partially-transmissive reflection mirror 4 and the total reflection mirror 5 can be always maintained even when the laser oscillation apparatus is placed in a cold atmosphere.

Figure 4:
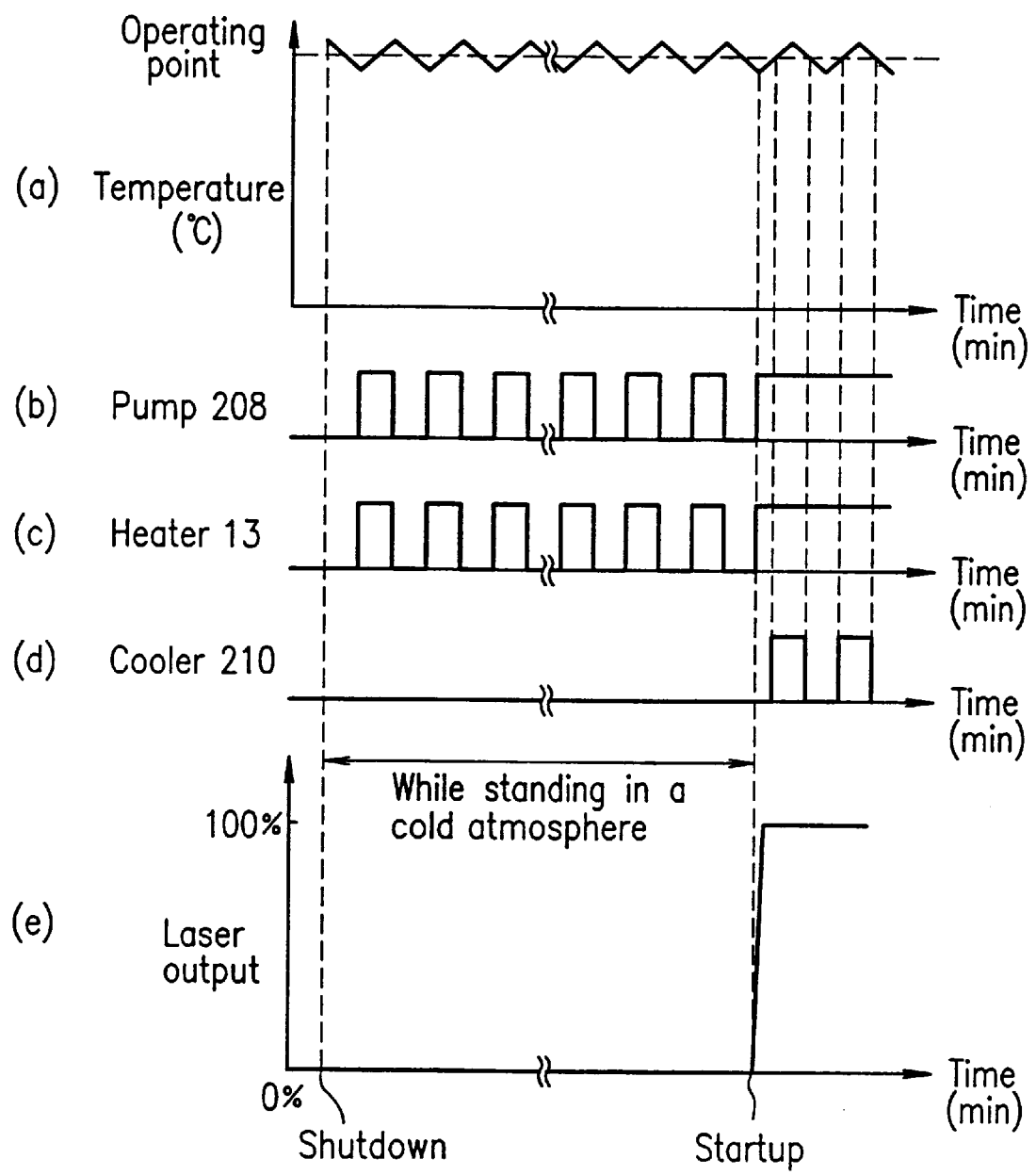
FIG. 4 shows diagrams provided for illustrating the operation of the cooling mechanism as shown in FIG. 3, and specifically: the portion (a) of FIG. 4 is a diagram schematically illustrating the change in the oil temperature in the cooling mechanism shown in FIG. 3 from shutdown to some time after subsequent start-up; the portions (b), (c) and (d) of FIG. 4 are diagrams illustrating the operation timing of a pump, a heater and a cooler in the cooling mechanism as shown in FIG. 3, respectively; and the portion (e) of FIG. 4 is a diagram schematically illustrating the change in the laser output of the laser oscillation apparatus after start-up when used with the cooling mechanism shown in FIG. 3.

FIG. 4 shows diagrams provided for illustrating the operation of the cooling mechanism for optical components in the laser oscillation apparatus shown in FIG. 3.

Particularly, the portion (a) of FIG. 4 schematically illustrates the change in the temperature of the oil in the cooling mechanism from shutdown to some time after subsequent start-up. The temperature indicated therein can be considered as the temperature of the holder 207, which is cooled by the oil. Moreover, the portion (e) of FIG. 4 is a diagram schematically illustrating the change in the laser output of the laser oscillation apparatus after start-up, and the portions (b), (c) and (d) of FIG. 4 illustrate the operation timing of the pump 208, the heater 13 and the cooler 210, respectively.

In accordance with the present invention, while standing in a cold atmosphere, the pump 208 and the heater 13 are intermittently operated at appropriate times as shown in the portions (b) and (c) of FIG. 4. Thus, as shown in the portion (a) of FIG. 4, the oil temperature is maintained at around a predetermined operating point temperature while standing in a cold atmosphere. Thus, a stable laser oscillation can be achieved in a short period of time after start-up as shown in the portion (e) of FIG. 4.

Once the laser output becomes stable at the normal operating level, the control unit 14 acts to cause the cooler 210 to operate at an appropriate time as shown in the portion (d) of FIG. 4. This allows for a stable operation of the laser oscillation apparatus. The oil temperature is typically maintained at around 28° C.

Figure 15:
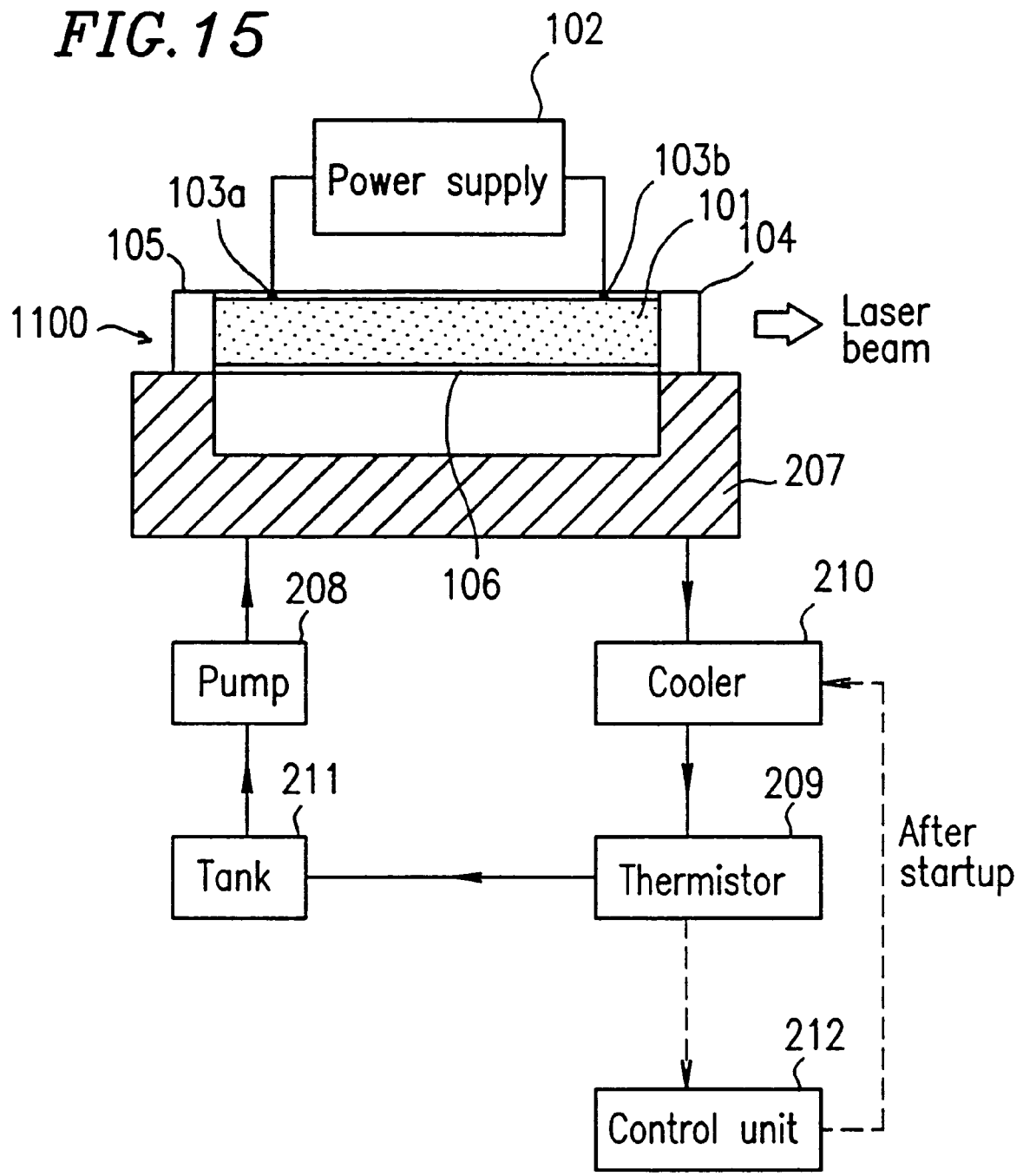
FIG. 15 is a diagram schematically illustrating an exemplary configuration of a cooling mechanism which can be used along with the laser cavity unit of a conventional laser oscillation apparatus.
Figure 16:
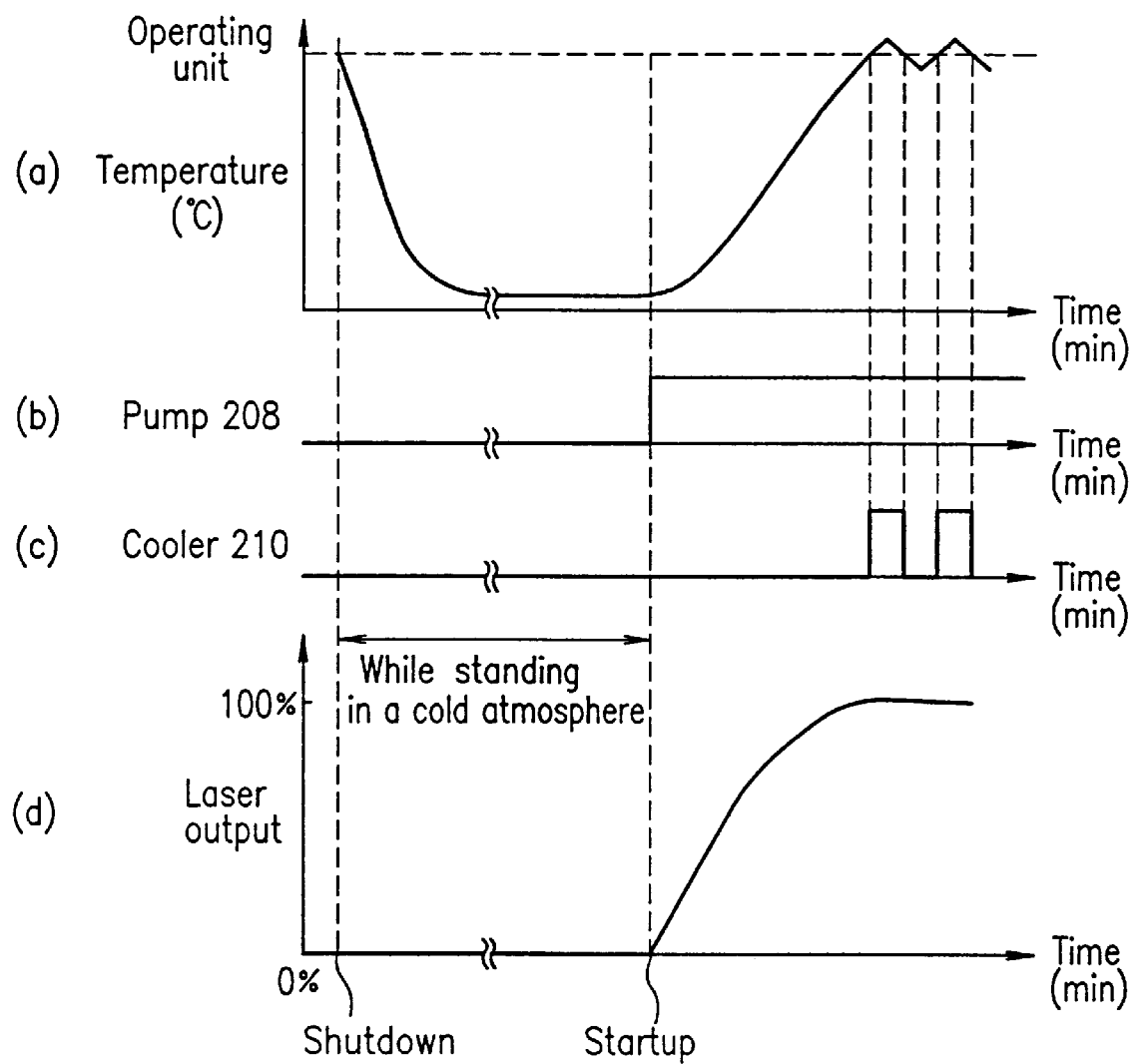
FIG. 16 shows diagrams provided for illustrating the operation of the conventional cooling mechanism as shown in FIG. 15, and specifically: the portion (a) of FIG. 16 is a diagram schematically illustrating the change in the oil temperature in the conventional cooling mechanism shown in FIG. 15 from shutdown to some time after subsequent start-up; the portions (b) and (c) of FIG. 16 arm diagrams illustrating the operation timing of a pump and a cooler in the conventional cooling mechanism as shown in FIG. 15, respectively; and the portion (d) of FIG. 16 is a diagram schematically illustrating the change in the laser output of the laser oscillation apparatus after start-up when used with the cooling mechanism shown in FIG. 15.
Figure 17:
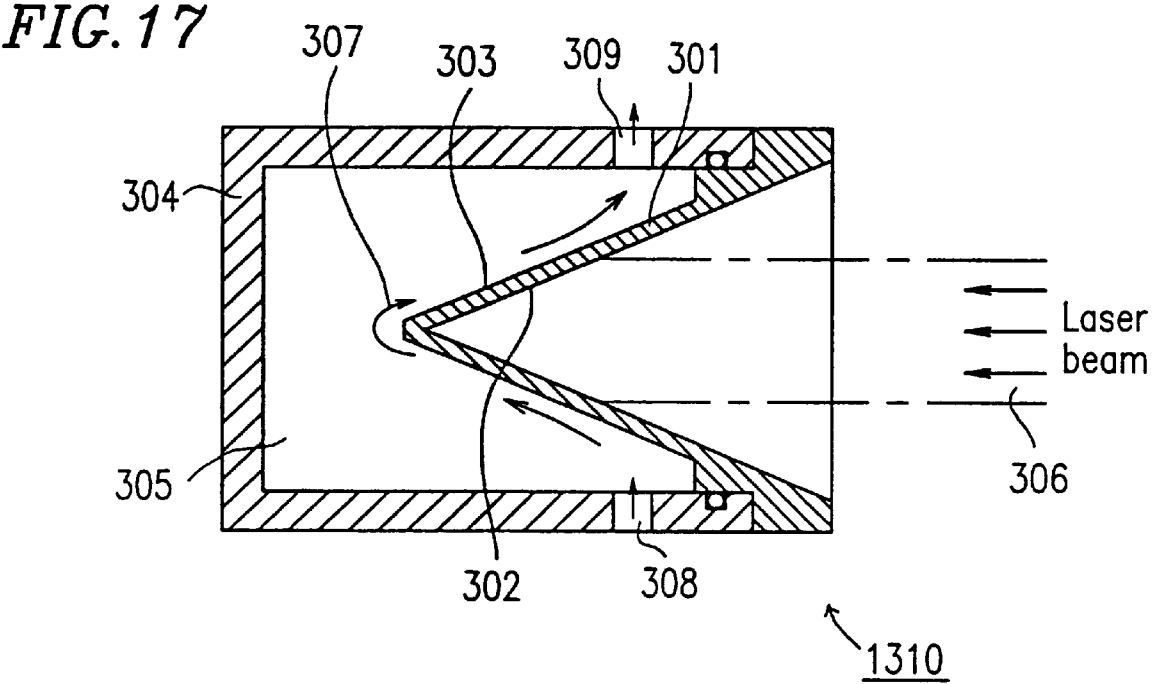
FIG. 17 is a cross-sectional view schematically illustrating a configuration of a conventional laser light absorption unit.
Figure 18:
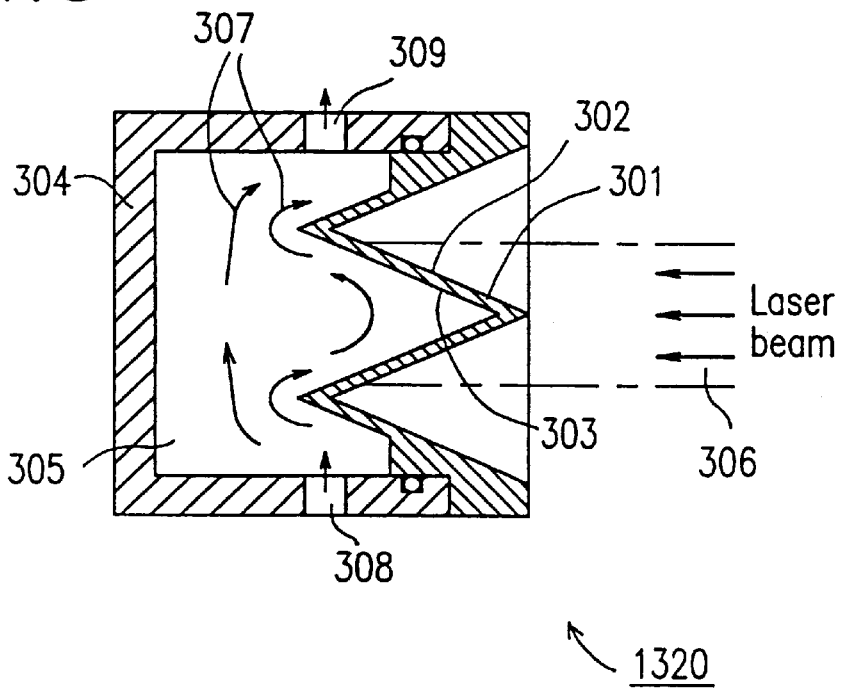
FIG. 18 is a cross-sectional view schematically illustrating a configuration of another conventional light absorption unit.
Figure 19:
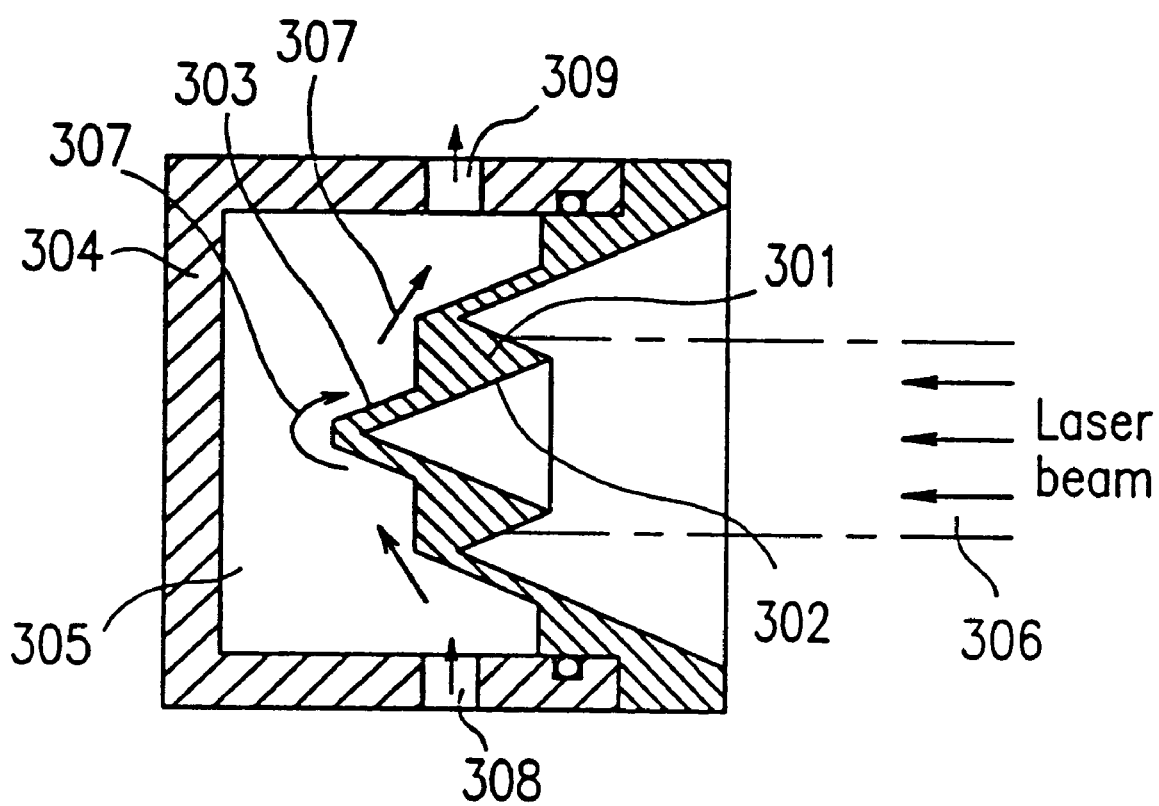
FIGS. 19 is a cross-sectional view schematically illustrating a configuration of yet another conventional light absorption unit.

In the conventional configuration described with reference to FIGS. 15 and 16, it typically takes about 30 minutes to achieve a stable laser output in the laser oscillation start-up after standing in a cold atmosphere. On the contrary, in the configuration of the present example having the above-described function, a stable laser output is typically achieved in only about 5 minutes.

Figure 5:
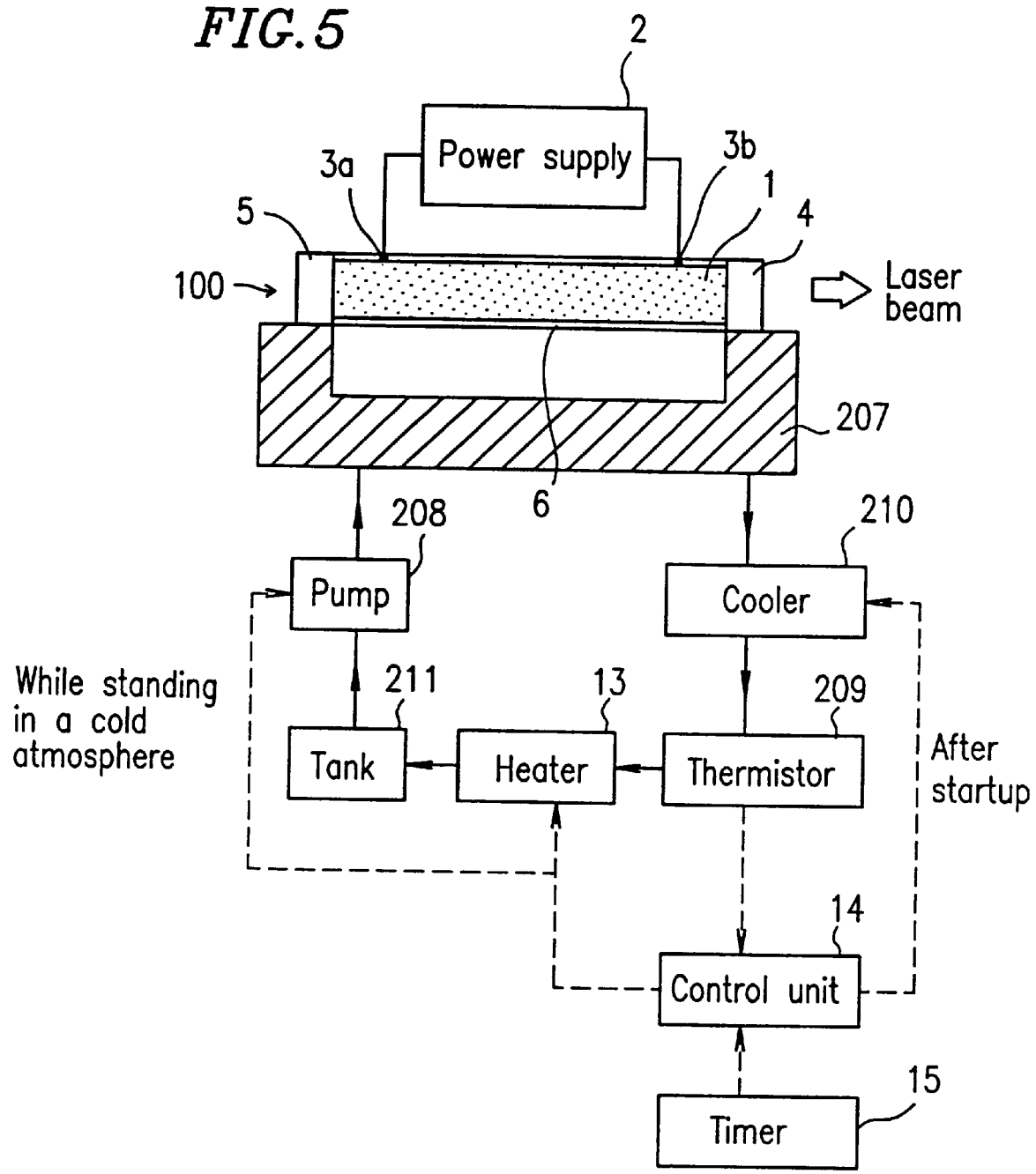
FIG. 5 is a diagram schematically illustrating an exemplary configuration of another cooling mechanism which can be used along with the laser cavity unit of the laser oscillation apparatus according to the present invention.

FIG. 5 is a diagram schematically illustrating an exemplary configuration of another cooling mechanism which can be used along with the laser cavity unit of the laser oscillation apparatus. Elements in FIG. 5 which are also shown in FIG. 3 are denoted by the same reference numerals and will not be further described.

Figure 6:
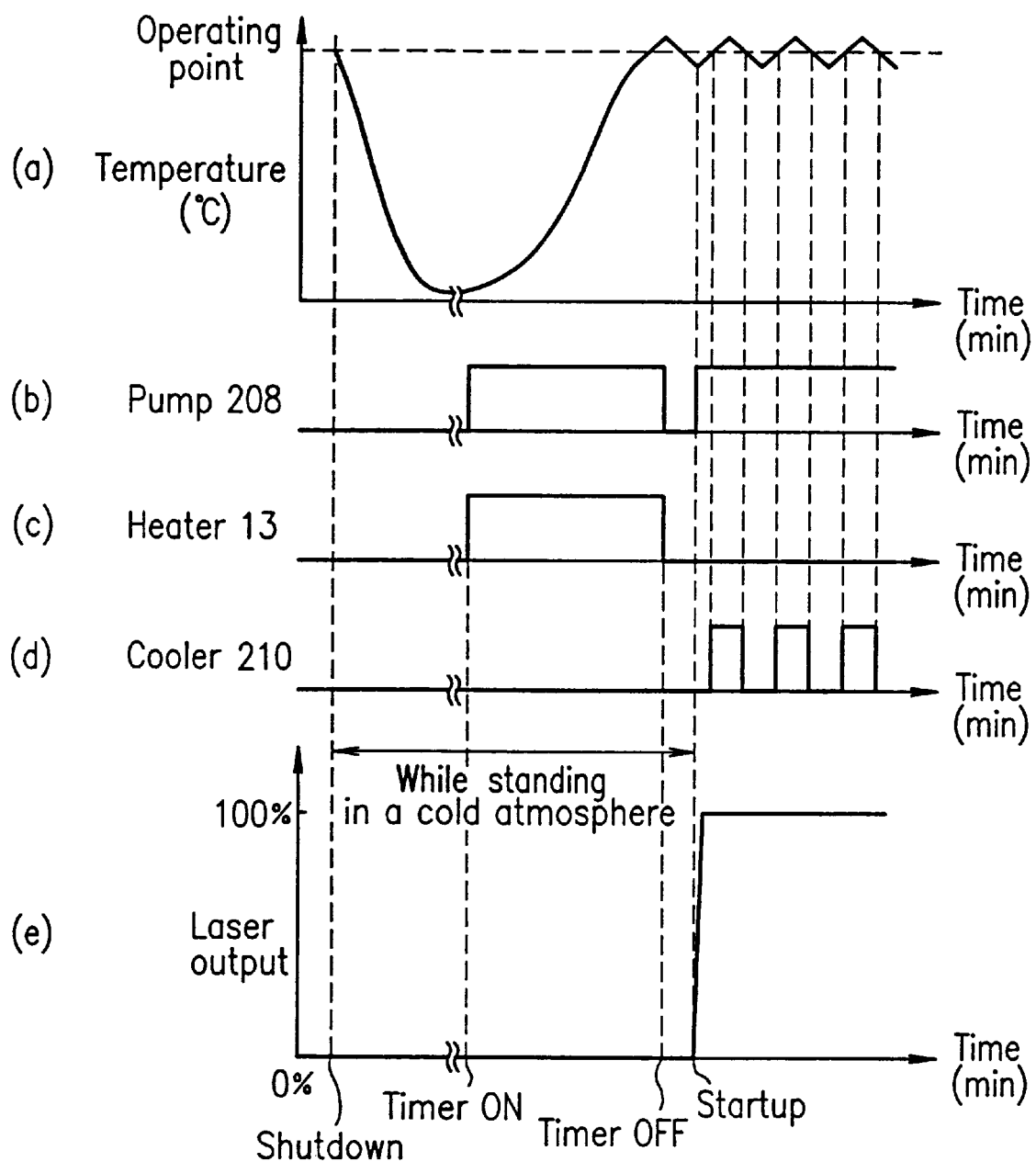
FIG. 6 shows diagrams provided for illustrating the operation of the cooling mechanism as shown in FIG. 5, and specifically: the portion (a) of FIG. 6 is a diagram schematically illustrating the change in the oil temperature in the cooling mechanism shown in FIG. 5 from shutdown to some time after subsequent start-up; the portions (b), (c) and (d) of FIG. 6 are diagrams illustrating the operation timing of a pump, a heater and a cooler in the cooling mechanism as shown in FIG. 5, respectively; and the portion (e) of FIG. 6 is a diagram schematically illustrating the change in the laser output of the laser oscillation apparatus after start-up when used with the cooling mechanism shown in FIG. 6.

Moreover, FIG. 6 shows diagrams provided for illustrating the operation of the cooling mechanism for optical components in the laser oscillation apparatus shown in FIG. 5. Particularly, the portion (a) of FIG. 6 schematically illustrates the change in the temperature of the oil in the cooling mechanism from shutdown to some time after subsequent start-up. The temperature indicated therein can be considered as the temperature of the holder 207, which is cooled by the oil. Moreover, the portions (e) of FIG. 6 is a diagram schematically illustrating the change in the laser output of the laser oscillation apparatus after start-up, and the portions (b), Cc) and (d) of FIG. 6 illustrate the operation timing of the pump 208, the heater 13 and the cooler 210, respectively.

In the configuration shown in FIG. 5, a timer 15 is further added to the control unit 14 in the configuration previously described with reference to FIG. 3. As shown in FIG. 6, when the oil temperature is decreased to a certain level, the timer 15 acts to cause the heater 13 and the pump 208 to operate for a certain period of time for heating the oil so that the oil temperature recovers to around the predetermined operating point temperature.

Alternatively, in the case where, for example, the laser oscillation apparatus is installed in a manufacturing apparatus in a plant and is scheduled such that the operation starts at a certain time (e.g., at 8:00 a.m. every morning), the timer 15 can act to cause the heater 13 and the pump 208 to operate for a certain period of time from a predetermined time prior to the scheduled start-up time for heating the oil. This allows the oil temperature to recover to around the predetermined operating point temperature by the scheduled time for starting up the laser oscillation apparatus. Such a configuration also allows a stable laser oscillation to be achieved in a short period of time after the start-up as shown in the portion (e) of FIG. 6.

Once the laser output becomes stable at the normal operating level, the control unit 14 acts to cause the cooler 210 to operate at an appropriate time as shown in the portion (d) of FIG. 6. This allows for a stable operation of the laser oscillation apparatus.

As described above, according to the present example, the heater 13 in addition to the pump 208, thermistor 209 and the cooler 210 is provided in the coolant conduit to the holder 207 which holds optical components such as the partially-transmissive reflection mirror 4 and the total reflection mirror 5. The control unit 14 is provided to appropriately control the operation of the pump 208, the heater 13 and the cooler 210. Thus, even during start-up after standing in a cold atmosphere, a stable laser output can be achieved in a short period of time.

In the above description, the present invention is described by way of an example where oil is used as the coolant for adjusting the temperature of the holder 207. However, the coolant to be used for this purpose is not limited to oil, but water, solution containing ethylene glycol, solution containing polyhydric alcohol, or the like can also be used.

Moreover, the thermistor 209 is used for the purpose of detecting the temperature of the coolant such as oil in the above description. However, any temperature sensors other than a thermistor, such as platinum-type temperature detector, thermo couple, or the like, can also be used for this purpose.

EXAMPLE 3

Next, a laser light absorption unit included in the laser oscillation apparatus of the present invention will be described with reference to FIGS. 7 to 13.

Figure 13:
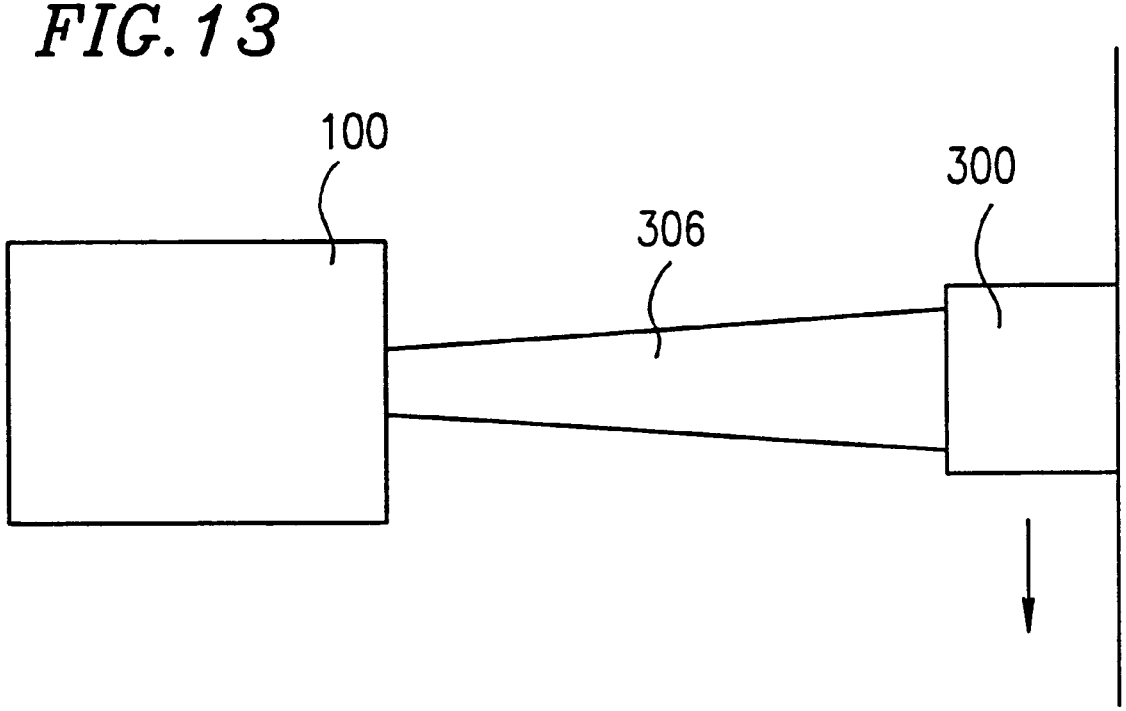
FIG. 13 is a diagram schematically illustrating positional relationship of the laser light absorption unit with respect to the optical path.
Figure 14:
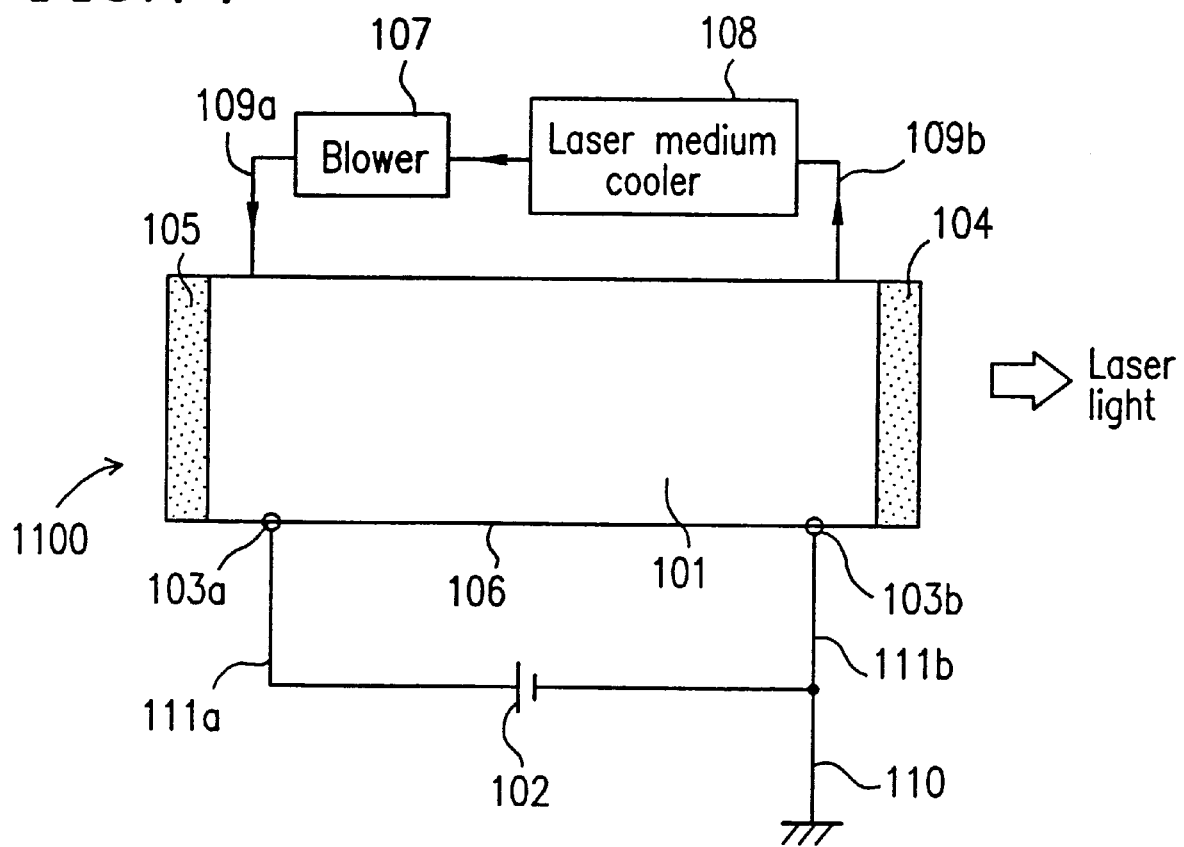
FIG. 14 is a diagram schematically illustrating a configuration around a laser cavity unit in a conventional laser oscillation apparatus.

FIG. 13 is a diagram schematically illustrating positional relationship of a laser light absorption unit 300 with respect to an optical path of a laser light 306 emitted from the laser cavity unit 100.

Particularly, the laser light absorption unit 300 is provided on the optical path of the laser light 306 irradiated from the laser cavity unit 100 in the laser oscillation apparatus. Normally, the laser light absorption unit 300 is located so as to block the optical path of the laser light 306, thereby preventing the laser light 306 generated in the laser cavity unit 100 from exiting the laser oscillation apparatus, and thus functioning as a safety apparatus. Then, once it is confirmed that the laser light 306 may exit (e.g., in a manufacturing site, when it is confirmed that the laser light 306 has been aimed to an object to be processed and that there is no obstruction in the intervening path), the laser light absorption unit 300 is shifted aside from the optical path of the laser light 306, e.g., as shown by an arrow in FIG. 13, so that the laser light 306 exits the laser oscillation apparatus.

As described previously, the conventional laser light absorption unit has non-uniform heat exchange due to the non-uniformity of the temperature distribution at the heat-exchanging surface, the imbalance of the coolant supply, or the like. In order to overcome such a problem, the laser light absorption unit of the present invention is formed by coupling an inner cylinder having a conical configuration in which the light-receiving surface for receiving laser light and the heat-exchanging surface are provided on the respective front and rear surfaces of the configuration and an outer cylinder forming a path for a coolant between the outer cylinder and the heat-exchanging surface of the inner cylinder, and moreover, a flow path adjuster is provided in the path for the coolant. The flow path adjuster causes the coolant to flow in a concentrated manner in the vicinity of the central portion of the heat-exchanging surface of the inner cylinder. Furthermore, the flow path adjuster and the heat-exchanging surface are coupled together at the interface therebetween by using a coupling material having a thermal conductivity of about 10 W/m•K or greater.

With the laser light absorption unit of the present invention having such a structure, sufficient heat exchange is provided in the central portion of the heat-exchanging surface, where the temperature becomes highest due to the laser light absorption.

Moreover, the flow path adjuster is coupled to the heat-exchanging surface by using a coupling material having a thermal conductivity of about 10 W/m•K or greater. Thus, the heat given to the central portion of the heat-exchanging surface in a concentrated manner is efficiently transferred to the flow path adjuster and is further dissipated to the ambient space through the outer cylinder. As a result, the temperature increase in the central portion of the heat-exchanging surface is considerably reduced. Furthermore, since the flow path adjuster itself functions as an extension of the heat-exchanging surface, the heat exchange area in the entire apparatus is effectively increased, thereby improving the heat exchange performance.

The above functions are sufficiently realized if the flow path adjuster is formed of at least one or more flat fixed blades. Thus, the flow path adjuster of the present invention can be realized with a simple structure, and provides cost advantage.

Figure 7:
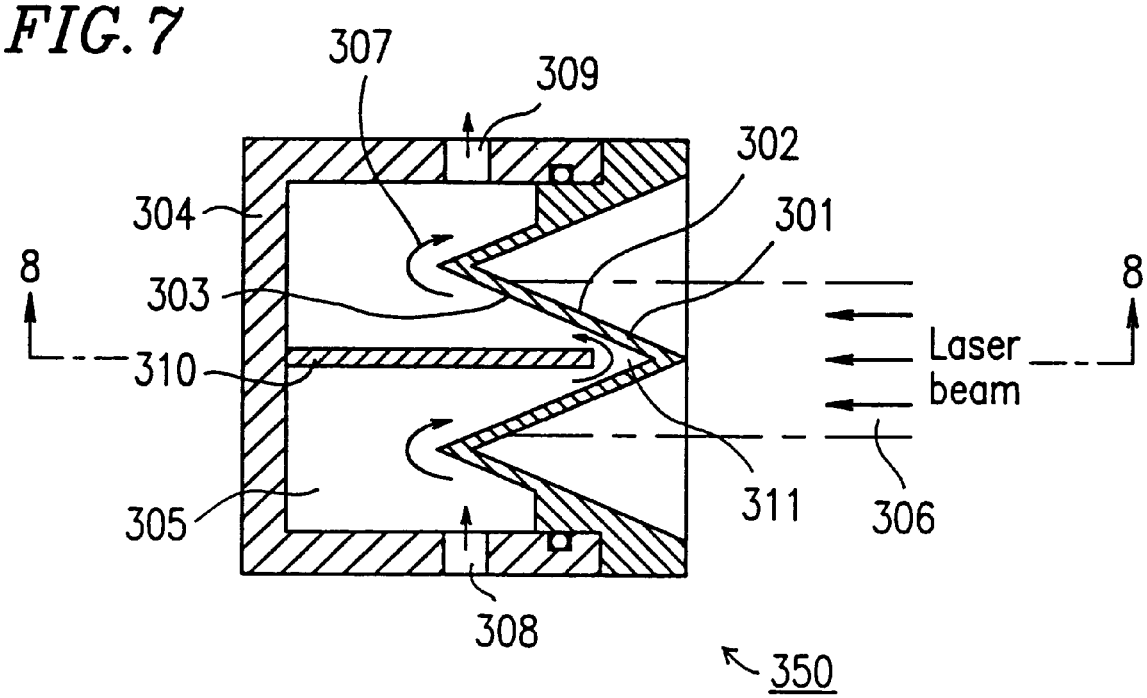
FIG. 7 is a cross-sectional view schematically illustrating a configuration of a laser light absorption unit according to the present invention.
Figure 8:
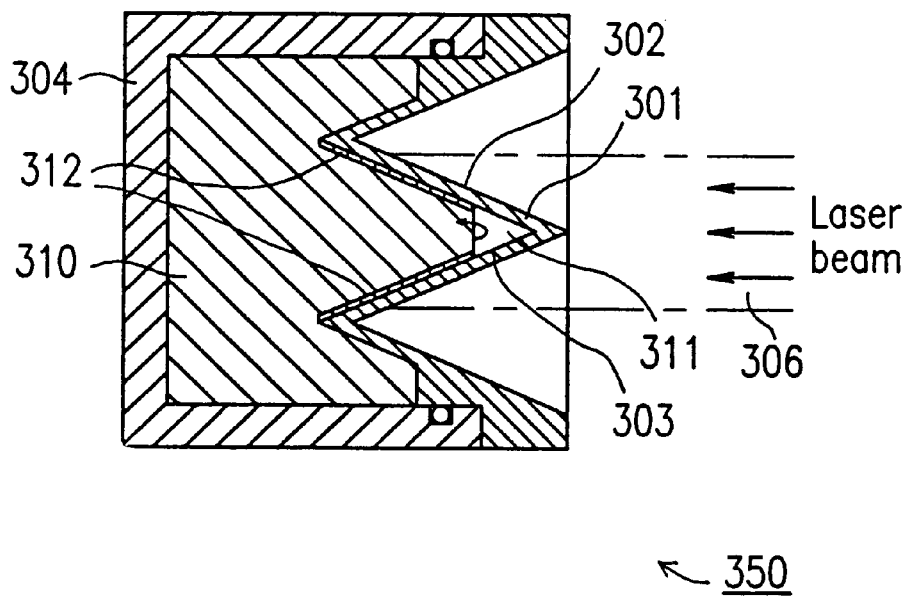
FIG. 8 is a cross-sectional view taken along the line 8—8 in FIG. 7.

FIG. 7 is a cross-sectional view schematically illustrating a configuration of a laser light absorption unit 350 of the present invention. Moreover, FIG. 8 is a cross-sectional view taken along the line 8—8 in FIG. 7.

In the laser light absorption unit 350, the inner cylinder 301 is provided at an opening of the outer cylinder 304. The inner cylinder 301 includes the light-receiving surface 302 and the heat-exchanging surface 303 respectively on the front surface and the rear surface of the inner cylinder 301. A space existing between the inner cylinder 301 and the outer cylinder 304 provides the path 305 for the coolant 307. The inner cylinder 301 is formed of a metallic material having a high thermal conductivity, e.g., copper, aluminum, brass, stainless steel, or the like.

Water can be used as the coolant 307, for example. Alternatively, oil, solution containing ethylene glycol, solution containing polyhydric alcohol, or the like can be used as the coolant 307.

The light-receiving surface 302 is formed by combining a plurality of conical configurations. Each of the conical surfaces of the conical configurations forms an angle of about 30° or less with respect to the incident axis of the laser light 306 so that the incident laser light 306 is not directed externally after being reflected. Moreover, the light-receiving surface 302 is coated with a material having a high absorptivity for the wavelength of the laser light 306 to be oscillated. The laser light 306 incident upon toe light-receiving surface 302 is quickly absorbed, and the heat thereof is transferred by conduction to the heat-exchanging surface 303.

A flow path adjuster 310 formed of the fixed flat blade is provided within the path 305 for the coolant 307. The flow path adjuster 310 is formed of, for example, a metallic material having a high thermal conductivity such as copper, aluminum, brass, stainless steel, or the like. The coolant 307 introduced into the path 305 through an inlet 308 exchanges heat at the heat-exchanging surface 303, and is drained through an outlet 309. During such a flow, the coolant 307 is blocked by the flow path adjuster 310 so that the coolant 307 passes in a concentrated manner through an opening 311 formed in the vicinity of the central portion of the heat-exchanging surface 303.

The heat-exchanging surface 303 and the flow path adjuster 310 are coupled together at an interface 312 therebetween (see FIG. 8) by using an appropriate coupling material. The coupling material is a material having a thermal conductivity of about 10 W/m•K or greater. Particularly, a brazing filler metal can be used, for example. Alternatively, materials such as a metallic material (e.g., copper, aluminum, brass, stainless steel, or the like) can be used as the coupling material.

Figure 9:
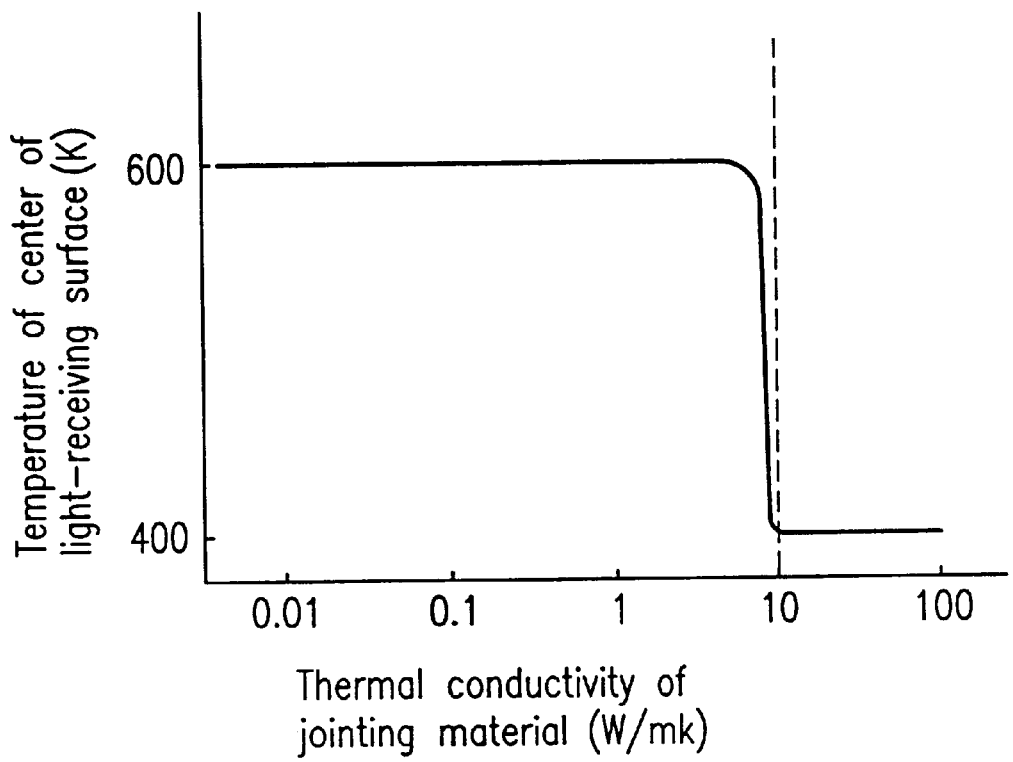
FIG. 9 is a diagram illustrating the relationship between thermal conductivity of a coupling material and temperature in the central portion of the light-receiving surface in the configuration of the laser light absorption unit shown in FIGS. 7 and 8.

As shown in FIG. 9, when the thermal conductivity of the coupling material is about 10 W/m•K or greater, the temperature of the light-receiving surface 302 around the center thereof stands at about 400K. On the other hand, when the thermal conductivity of the coupling material is less than about 10 W/m•K, the temperature of the light-receiving surface 302 around the center thereof rapidly increases. Therefore, in order for the coupling material to serve as a thermal conductor, the thermal conductivity thereof must be about 10 W/m•K or greater.

The laser light 306 incident upon the light-receiving surface 302 is absorbed by the light-receiving surface 302, and the heat thereof is transferred by conduction to the heat-exchanging surface 303 through the so inner cylinder 301. A portion of heat transferred to the heat-exchanging surface 303, especially at a central portion where the temperature is high, is further transferred to the flow path adjuster 310 through the interface 312. Thus, the flow path adjuster 310 itself functions as the heat-exchanging surface, so that the temperature increase at the center of the heat-exchanging surface 303 is reduced.

Figure 10:
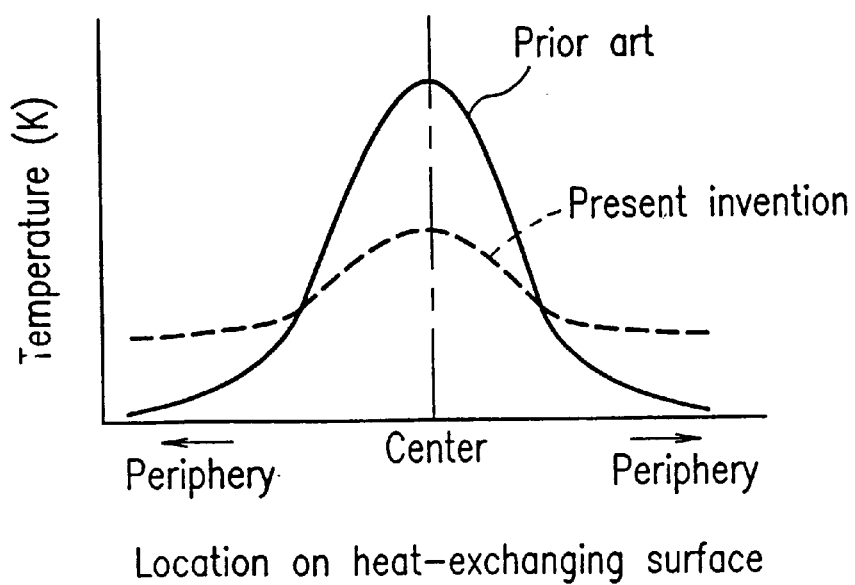
FIG. 10 is a diagram illustrating a measured result of the temperature distribution in the heat-exchanging surface in the configuration of the laser light absorption unit shown in FIGS. 7 and 8.

FIG. 10 illustrates an exemplary thermographic measurement of the temperature distribution in the heat-exchanging surface 303 of the inner cylinder 301. The horizontal axis represents the location on the heat-exchanging surface 303, whereas the vertical axis represents the measured temperature (K) at each position. The measured data for the present invention (represented by 7; the dashed line) shows that, as compared to the measured data for the conventional configuration (represented by the solid line), the temperature In the central portion is reduced while the temperature in the peripheral portion is increased. Thus, in accordance with the present invention, the temperature on the whole heat-exchanging surface 303 is more balanced.

In the conventional technique, the dissipation of heat has been achieved only on the heat-exchanging surface 303. According to the present invention, heat in the central portion of the heat-exchanging surface 303 is transferred to the flow path adjuster 310 through thermal conduction as described above, so that the dissipation of the absorbed heat is also provided on the surface of the flow path adjuster 310. Moreover, since the coolant 307 passes in a concentrated manner through the opening 311 formed in the vicinity of the central portion of the heat-exchanging surface 303, as shown in FIGS. 7 and 8, the heat exchange performance at the central portion of the heat-exchanging surface 303 is improved. Due to such a dual effect, the laser light absorption unit 350 of the present invention allows for a stable heat exchange as a whole.

In the laser light absorption unit 350 of the present invention, since the light-receiving surface 302 is always exposed to the irradiation of the laser light 306, damage thereto is inevitable. However, by making the temperature of the heat-exchanging surface 303 uniform as described above, the temperature of the light-receiving surface 302 also becomes uniform, and in particular, the temperature increase in the central portion is reduced. Therefore, the damage to the light-receiving surface 302 can be minimized, thereby allowing for a long-term stable use of the apparatus.

Figure 11:
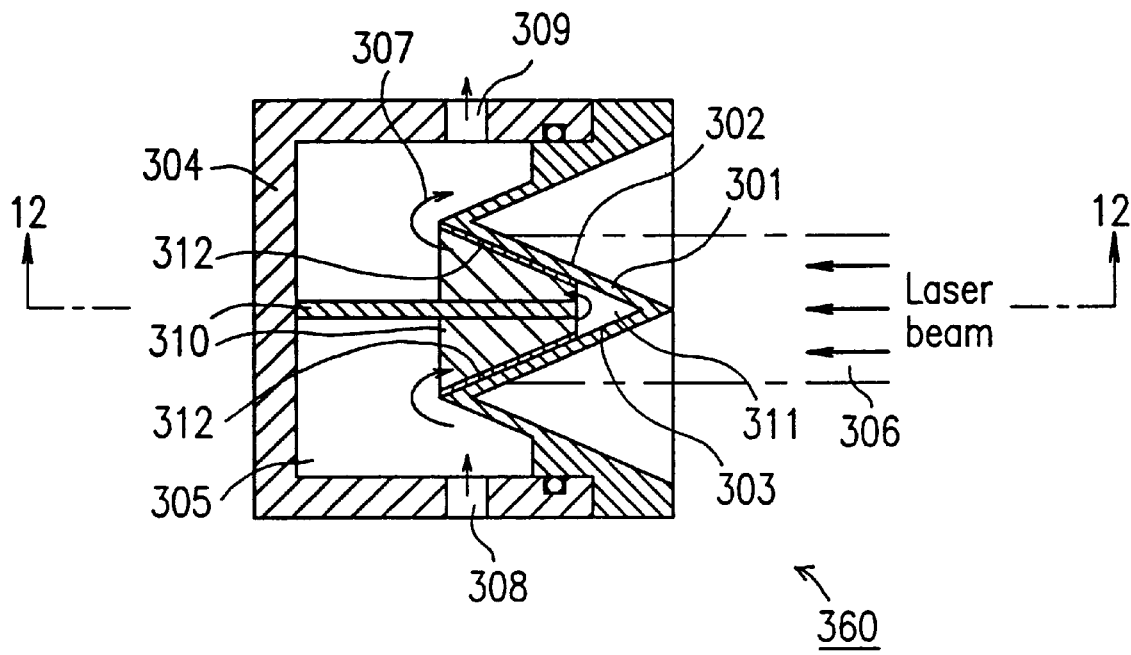
FIG. 11 is a cross-sectional view schematically illustrating a configuration of another laser light absorption unit according to the present invention.
Figure 12:
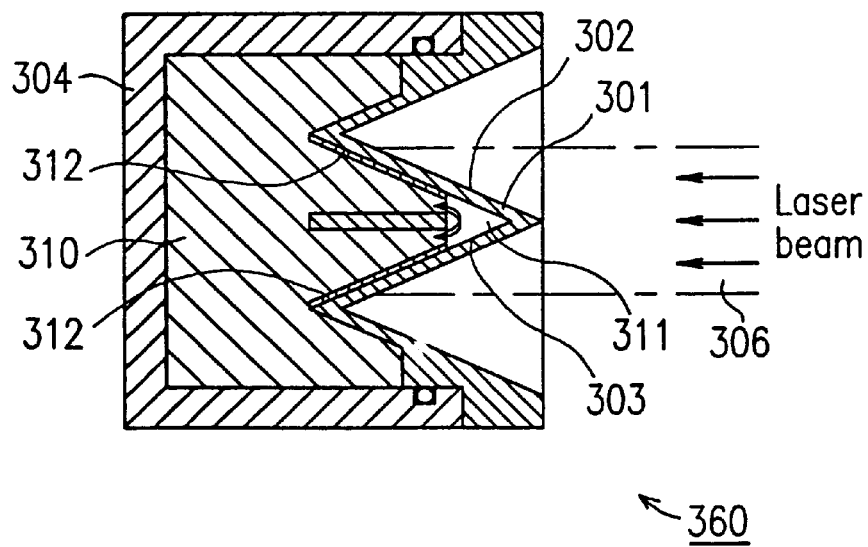
FIG. 12 is a cross-sectional view taken along the line 12—12 in FIG. 11.

FIG. 11 is a cross-sectional view schematically illustrating a configuration of another laser light absorption unit 360 according to the present invention. Moreover, FIG. 12 is a cross-sectional view taken along the line 12—12 in FIG. 11. Elements in FIGS. 11 and 12 which are also shown in FIGS. 7 and 8 are denoted by the same reference numerals and will not be further described.

In the laser light absorption unit 360, the flow path adjuster 310 is formed of two fixed flat blades orthogonally crossing each other. Due to such a configuration, as compared to the above-described laser light absorption unit 350, the contact area at the interface 312 between the heat-exchanging surface 303 and the flow path adjuster 310 is increased, so that a further improved heat conduction effect can be realized. Moreover, since the surface area of the flow path adjuster 310 is increased, the heat exchange area in the entire apparatus is increased, thereby also improving the diffusion effect for the absorbed heat.

As described above, in the laser light absorption unit of the present invention, the flow path adjuster is provided in the coolant path so that the coolant flows in a concentrated manner in the vicinity of the central portion of the heat-exchanging surface of the conically-shaped inner cylinder. Moreover, at the interface between the flow path adjuster and the heat-exchanging is surface, a coupling material having a thermal conductivity of about 10 W/m•K or greater is provided. Thus, the temperature distribution on the light-receiving surface is made uniform, thus allowing for a long-term stable laser light absorption.

In the above, some embodiments of the present invention have been individually described in connection with the connection circuit for the laser cavity unit (the discharge electrodes) of the DC high voltage power source for the laser oscillation apparatus, the cooling mechanism for the holder of the optical components, and the laser light absorption unit, respectively. However, the contents of the respective examples area not only applicable individually, but also applicable in combination.

Moreover, the various examples of the present invention have been described above in connection with a gas laser (e.g., a $CO_2$ laser) in which the gaseous laser medium in the laser cavity unit is excited through discharge which is generated upon application of voltage. However, application of the contents of the present invention is not limited to such a gas laser. In fact, similar effects can be realized when applied to a laser oscillation apparatus including a laser cavity unit of other types, e.g., a YAG laser or the like.

Various other modifications will be apparent to and can be readily made by those skilled in the art without departing from the scope and spirit of this Invention. Accordingly, it is not intended that the scope of the claims appended hereto be limited to the description as set forth herein, but rather that the claims be broadly construed.

What is claimed is:

1. A laser oscillation apparatus, comprising:
   a laser cavity unit, having a pair of discharge electrodes and a pair of mirrors, for generating laser light by a discharge of a gaseous laser medium caused by application of a voltage to the pair of discharge electrodes and optical amplification of the generated light by means of the pair of mirrors;
   a DC power source for supplying the voltage required for generating the laser light to the pair of discharge electrodes of the laser cavity unit;
   feeder cables for respectively connecting a cathode and an anode of the DC power source to the pair of discharge electrodes of the laser cavity unit, and each of the cathode and the anode of the DC power source is grounded via a grounding resistor, the respective grounding resistors having substantially the same resistance values, whereby voltages reduced by the grounding electrodes are applied to the feeder cables.

2. A laser oscillation apparatus according to claim 1, wherein the voltages supplied to the pair of discharge electrodes are substantially at a same level with each other.

3. A laser oscillation apparatus according to claim 1, further comprising:

a holder for holding at least the pair of mirrors; and a cooling mechanism for cooling the holder with a coolant, wherein the cooling mechanism includes a pump for circulating the coolant, a detector for detecting a temperature of the coolant, a heater for heating the coolant, and a control unit, the control unit causing the pump and the heater to operate while the laser oscillation apparatus is standing so as to increase the temperature of the coolant.

4. A laser oscillation apparatus according to claim 3, wherein the cooling mechanism further includes a timer connected to the control unit.

5. A laser oscillation apparatus according to claim 4, wherein the control unit causes the pump and the heater to operate for a certain period of time prior to start-up of the apparatus in accordance with operation of the timer.

6. A laser oscillation apparatus according to claim 1, further comprising a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus, wherein:

the laser light absorption unit includes an outer cylinder and an inner cylinder which is provided at an opening of the outer cylinder, the inner cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant;

the laser light absorption unit further includes a flow path adjuster having a shape such that the coolant flows in a concentrated manner in the vicinity of a central portion of the light-receiving surface; and the flow path adjuster and the heat-exchanging surface are coupled together at an interface therebetween by using a coupling material having a thermal conductivity of about 10 W/m•K or greater.

7. A laser oscillation apparatus according to claim 6, wherein the flow path adjuster is formed of at least one blade.

8. A laser oscillation apparatus according to claim 1, further comprising:

a holder for holding at least the pair of mirrors;

a cooling mechanism for cooling the holder with a coolant; and a laser light absorption unit which is provided so as to be movable between a first position where the laser light absorption unit blocks oscillated laser light to prevent the laser light from exiting the laser oscillation apparatus and a second position where the laser light absorption unit allows the laser light to exit the laser oscillation apparatus, wherein:

the cooling mechanism includes a pump for circulating the coolant, a detector for detecting a temperature of the coolant, a heater for heating the coolant, and a control unit, the control unit causing the pump and the heater to operate while the laser oscillation apparatus is standing so as to increase the temperature of the coolant;

the laser light absorption unit includes an outer cylinder and an inner cylinder which is provided at an opening of the outer cylinder, the inner cylinder having at least one conical configuration in which a front surface thereof functions as a light-receiving surface for receiving laser light whereas a rear surface thereof functions as a heat-exchanging surface, with a space between the inner cylinder and the outer cylinder providing a path for a coolant; the laser light absorption unit further includes a flow path adjuster having a shape such that the coolant flows in a concentrated manner in the vicinity of a central portion of the light-receiving surface; and the flow path adjuster and the heat-exchanging surface are coupled together at an interface therebetween by using a coupling material having a thermal conductivity of about 10 W/m•K or greater.

9. A laser oscillation apparatus according to claim 8, wherein the cooling mechanism further includes a timer connected to the control unit.

10. A laser oscillation apparatus according to claim 9, wherein the control unit causes the pump and the heater to operate for a certain period of time prior to start-up of the apparatus in accordance with operation of the timer.

11. A laser oscillation apparatus according to claim 8, wherein the flow path adjuster is formed of at least one blade.

* * * * *